(12) United States Patent
Ozawa et al.

(10) Patent No.: US 10,982,063 B2
(45) Date of Patent: Apr. 20, 2021

(54) RESIN COMPOSITION, MOLDED PRODUCT AND METHOD FOR ITS PRODUCTION, PREPREG AND METHOD FOR ITS PRODUCTION, AND FIBER-REINFORCED MOLDED PRODUCT AND METHOD FOR ITS PRODUCTION

(71) Applicant: AGC Inc., Chiyoda-ku (JP)

(72) Inventors: Norio Ozawa, Chiyoda-ku (JP);
Tomoya Hosoda, Chiyoda-ku (JP);
Takashi Sato, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/751,301

(22) Filed: Jan. 24, 2020

(65) Prior Publication Data
US 2020/0157301 A1 May 21, 2020

Related U.S. Application Data

(63) Continuation of application No. PCT/JP2018/034045, filed on Sep. 13, 2018.

(30) Foreign Application Priority Data

| Sep. 14, 2017 | (JP) | JP2017-176757 |
| Oct. 6, 2017 | (JP) | JP2017-195880 |
| May 21, 2018 | (JP) | JP2018-097288 |

(51) Int. Cl.
| C08J 5/24 | (2006.01) |
| B29C 70/34 | (2006.01) |
| B32B 27/12 | (2006.01) |
| B32B 27/34 | (2006.01) |
| C08L 77/02 | (2006.01) |
| B29K 307/04 | (2006.01) |

(52) U.S. Cl.
CPC ............... *C08J 5/24* (2013.01); *B29C 70/345* (2013.01); *B32B 27/12* (2013.01); *B32B 27/34* (2013.01); *C08L 77/02* (2013.01); *B29K 2307/04* (2013.01); *B32B 2262/106* (2013.01); *C08J 2377/02* (2013.01); *C08J 2427/18* (2013.01)

(58) Field of Classification Search
CPC ............... C08L 27/12–24; C08L 57/00; C08L 77/00–10
See application file for complete search history.

(56) References Cited

FOREIGN PATENT DOCUMENTS

| JP | 2008087402 A | * | 4/2008 |
| JP | 2012-501407 A | | 1/2012 |
| JP | 2013-531717 A | | 8/2013 |
| WO | WO 2017/122735 A1 | | 7/2017 |

OTHER PUBLICATIONS

JP 2008087402 A machine translation (Apr. 2008).*
International Search Report dated Dec. 4, 2018 in PCT/JP2018/034045 filed on Sep. 13, 2018, 2 pages.

* cited by examiner

*Primary Examiner* — Ana L. Woodward
(74) *Attorney, Agent, or Firm* — Oblon, McClelland, Maier & Neustadt, L.L.P.

(57) ABSTRACT

To provide a resin composition, wherein the resin composition is excellent in impregnation into a reinforcing fiber sheet as it contains a polyamide having a low viscosity number; wherein the resin composition can be molded into a film, a fiber, etc., even though it contains a polyamide having a low viscosity number; and wherein the resin composition can produce a fiber-reinforced molded product having excellent impact resistance; a molded product and a method for its production; and a fiber-reinforced molded product having excellent impact resistance and a method for its production.

A resin composition comprising:
  a polyamide having a viscosity number of from 100 to 170 determined by a method specified in ISO 307: 2007; and
  a melt-processable fluororesin having at least one type of a functional group selected from the group consisting of a carbonyl group-containing group, a hydroxy group, an epoxy group and an isocyanate group, and having a melting point of from 100 to 325° C.

16 Claims, No Drawings

RESIN COMPOSITION, MOLDED PRODUCT AND METHOD FOR ITS PRODUCTION, PREPREG AND METHOD FOR ITS PRODUCTION, AND FIBER-REINFORCED MOLDED PRODUCT AND METHOD FOR ITS PRODUCTION

TECHNICAL FIELD

The present invention relates to a resin composition, a molded product and a method for its production, a prepreg and a method for its production, and a fiber-reinforced molded product and a method for its production.

BACKGROUND ART

Fiber-reinforced molded products have been employed in a wide range of applications including transport equipment (vehicles (automobiles, railway vehicles, etc.), aircrafts, etc.), building components, electronic devices, medical devices, etc. As matrix resins for the fiber-reinforced molded products, cured products of thermosetting resins have been commonly employed.

However, as for fiber-reinforced molded products using cured products of thermosetting resins as matrix resins, it takes time to cure the thermosetting resins, which cause problems such as poor productivity, low impact resistance, and poor prepreg storage stability. In order to solve these problems, a prepreg and a fiber reinforced molded product using a thermoplastic resin as a matrix resin have been proposed (Patent Documents 1 and 2).

However, the fiber reinforced molded product using a thermoplastic resin as a matrix resin is still insufficient in terms of impact resistance.

As a prepreg capable of obtaining a fiber reinforced molded product excellent in impact resistance, a matrix resin comprising a thermoplastic resin and a melt-processable fluororesin having at least one type of a functional group selected from a carbonyl group-containing group, a hydroxy group, an epoxy group, and an isocyanate group, has been proposed (Patent Document 3).

PRIOR ART DOCUMENTS

Patent Documents

Patent Document 1: JP-A-2013-531717
Patent Document 2: JP-A-2012-501407
Patent Document 3: WO 2017/122735

DISCLOSURE OF INVENTION

Technical Problem

A prepreg using a thermoplastic resin as a matrix resin is produced by laminating a film, a fiber, etc. of a matrix resin and a reinforcing fiber sheet and then melting the film, the fiber, etc. and impregnating it in the reinforcing fiber sheet. As the thermoplastic resin of the matrix resin of the prepreg, a polyamide is widely used in view of its excellent balance between strength characteristics and moldability.

In a prepreg and a fiber-reinforced molded product, it is extremely important to improve the matrix resin impregnation into the reinforced fiber sheet in view of the impact resistance of the fiber-reinforced molded product. However, in the Examples of Patent Document 3, a prepreg using a polyamide as a thermoplastic resin is insufficient in view of the impregnation property of the matrix resin into the reinforcing fiber sheet.

In order to improve the impregnation property of the matrix resin into the reinforcing fiber sheet, it is conceivable to reduce the viscosity number of a polyamide. However, a polyamide having a low viscosity number is usually used for injection molding. Lowering the viscosity number of the polyamide increases the drawdown during extrusion, and so when a polyamide having a low viscosity number is molded into a film, a fiber, etc., the molding becomes unstable and causes necking. In view of the above, it is a common technical knowledge that the film width and the yarn diameter cannot be adjusted. Necking is a phenomenon in which the width or diameter of a molded resin flowing from an extrusion die becomes rapidly narrower and smaller.

The present invention provides a resin composition, wherein the resin composition is excellent in impregnation into a reinforcing fiber sheet as it contains a polyamide having a low viscosity number; wherein the resin composition can be molded into a film, a fiber, etc., even though it contains a polyamide having a low viscosity number; and wherein the resin composition can produce a fiber-reinforced molded product having excellent impact resistance. The present invention also provides a resin composition molded product which is excellent in impregnation into a reinforcing fiber sheet and which can produce a fiber-reinforced molded product having excellent impact resistance, and a method for its production. Further, the present invention provides a prepreg in which a resin composition containing a polyamide is sufficiently impregnated in a reinforcing fiber and which can produce a fiber-reinforced molded product having excellent impact resistance, and a method for its production. The present invention provides a fiber-reinforced molded product excellent in impact resistance and a method for its production.

Solution to Problem

The present invention has the following embodiments.
<1> A resin composition comprising:
a polyamide having a viscosity number of from 100 to 170 determined by a method specified in ISO 307: 2007; and
a melt-processable fluororesin having at least one type of a functional group selected from the group consisting of a carbonyl group-containing group, a hydroxy group, an epoxy group and an isocyanate group, and having a melting point of from 100 to 325° C.
<2> The resin composition according to <1>, wherein the polyamide is at least one type selected from the group consisting of polyamide 6, polyamide 66, polyamide 46, polyamide 11, polyamide 12, polyamide 9T, polyamide 610, polyamide 612, polyamide 6/66 copolymer, polyamide 6/66/610 copolymer, polyamide 6T, polyamide 6I and polyamide MXD6.
<3> The resin composition according to <1> or <2>, wherein the polyamide is polyamide 6, and the melt flow rate of the resin composition measured at a temperature of 260° C. under a load of 21.2N is from 20 to 150 g/10 min.
<4> The resin composition according to <1> or <2>, wherein the polyamide is polyamide 12 and the melt flow rate of the resin composition measured at a temperature of 250° C. under a load of 21.2N is from 20 to 120 g/10 min.
<5> The resin composition according to any one of <1> to <4>, wherein, in the total volume of the polyamide and the fluororesin, the polyamide is from 55 to 95% by volume and the fluororesin is from 5 to 45% by volume, and the total of the polyamide and the fluororesin is from 80 to 100 mass % of the resin composition.

<6> A prepreg comprising a matrix resin and a reinforcing fiber, wherein the matrix resin is the resin composition as defined in any one of <1> to <5>.

<7> The prepreg according to <6>, wherein the reinforcing fiber is an spread reinforcing fiber.

<8> The prepreg according to <6> or <7>, wherein the reinforcing fiber is a reinforcing fiber textile, a reinforcing fiber knitting, or a unidirectional reinforcing fiber bundle.

<9> A fiber-reinforced molded product, formed by molding the prepreg as defined in any one of <6> to <8>.

<10> A molded product made of the resin composition as defined in any one of <1> to <5>.

<11> The molded product according to <10>, wherein the molded product is a film or a fiber.

<12> A method for producing a prepreg, wherein the molded product as defined in <10> or <11> is melted in the presence of a reinforcing fiber sheet and impregnated in the reinforcing fiber sheet.

<13> The method for producing a prepreg according to <12>, wherein the reinforcing fiber sheet is an spread reinforcing fiber sheet.

<14> The method for producing a prepreg according to <12> or <13>, wherein the reinforcing fiber sheet is a reinforcing fiber textile, a reinforcing fiber knitting, or a unidirectional reinforcing fiber bundle.

<15> A method for producing a fiber-reinforced molded product, wherein a prepreg is obtained in accordance with the method for producing a prepreg as defined in any one of <12> to <14> and then the prepreg is molded.

<16> A method for producing a fiber-reinforced molded product, wherein a reinforcing fiber sheet and the film as defined in <11> are laminated in a mold and then molded by hot pressing.

Advantageous Effects of Invention

The resin composition of the present invention is excellent in impregnation into a reinforcing fiber sheet as it contains a polyamide having a low viscosity number, and can be molded into a film, a fiber, etc., even though it contains a polyamide having a low viscosity number. In addition, according to the resin composition of the present invention, it is possible to obtain a fiber-reinforced molded product excellent in impact resistance.

The molded product of the present invention is excellent in impregnation into a reinforcing fiber sheet. The molded product of the present invention can provide a fiber-reinforced molded product having excellent impact resistance.

According to the method for producing a molded product of the present invention, it is possible to produce a molded product which is excellent in the impregnation into a reinforcing fiber sheet and which can provide a fiber-reinforced molded product excellent in impact resistance.

The prepreg of the present invention is obtained by sufficiently impregnating a resin composition containing a polyamide in a reinforcing fiber sheet. Moreover, according to the prepreg of the present invention, a fiber-reinforced molded product having excellent impact resistance can be obtained.

According to the method for producing a prepreg of the present invention, it is possible to produce a prepreg in which a resin composition containing a polyamide is sufficiently impregnated in a reinforcing fiber and which provide a fiber-reinforced molded product having excellent impact resistance.

The fiber-reinforced molded product of the present invention is excellent in impact resistance.

According to the method for producing a fiber-reinforced molded product of the present invention, it is possible to produce a fiber-reinforced molded product excellent in impact resistance.

DESCRIPTION OF EMBODIMENTS

The following definitions of terms apply throughout the specification including claims.

The "viscosity number" is a value determined by a method for determining the viscosity number of a diluted polyamide solution in a specified solvent as defined in ISO 307: 2007 (corresponding to Japanese Industrial Standards JIS K 6933: 2013), which shows an indicator for the molecular weight of the polyamide.

Being "melt-processable" means showing a melt flowability.

"Showing a melt flowability" means that a temperature at which the melt flow rate becomes to be from 0.1 to 1,000 g/10 min. is present in a temperature range higher by at least 20° C. than the melting point of the resin under a condition of a load of 49N or 21.2N.

The "melting point" is the temperature corresponding to the maximum value of the melting peak as measured by a differential scanning calorimetry (DSC) method.

The "melt flow rate" is a melt mass flow rate (MFR) specified in JIS K7210-1; 2014 (corresponding to ISO 1133-1; 2011).

The "carbonyl group-containing group" means a group having a carbonyl group (—C(=O)—) in the structure.

The "acid anhydride group" means a group represented by —C(=O)—O—C(=O)—

The "unit based on a monomer" is a general term for an atomic group directly formed by polymerization of one monomer molecule and an atomic group obtained by chemically converting a part of the above-mentioned atomic group. In the present specification, a unit based on a monomer is simply referred to also as a monomer unit.

<Resin Composition>

The resin composition of the present invention comprises a polyamide (hereinafter, referred to also as "polyamide A") having a viscosity number of from 100 to 170; and a melt-processable fluororesin (hereinafter, referred to also as "fluororesin B") having at least one type of a functional group selected from the group consisting of a carbonyl group-containing group, a hydroxy group, an epoxy group and an isocyanate group, and having a melting point of from 100 to 325° C. The resin composition of the present invention may contain other components other than the polyamide A and the fluororesin B as needed.

The resin composition of the present invention is used as a matrix resin of a prepreg.

<Polyamide A>

The polyamide A has a viscosity number of from 100 to 170, preferably from 105 to 165, more preferably from 110 to 160. There is a correlation between a viscosity number and a melt viscosity. A polyamide having a high viscosity number has a high melt viscosity, while a polyamide having a low viscosity number has a low melt viscosity. If the viscosity number is less than the lower limit value in the above range, it is difficult to mold the resin composition into a film, a fiber, etc. even though the polyamide A and the fluororesin B are used in combination. When the viscosity number is at most the upper limit value in the above range, the moldability of the resin composition will be excellent.

The polyamide A can be produced, for example, by ring-opening polymerization or polycondensation of a ω-amino acid, a lactam or a dicarboxylic acid with a diamine or the like.

The ω-amino acid may be ε-aminocaproic acid, 7-aminoheptanoic acid, 9-aminononanoic acid, 11-aminoundecanoic acid, 12-aminododecanoic acid, 2-chloro-paraaminomethylbenzoic acid, 2-methyl-paraaminomethylbenzoic acid, 4-aminomethylbenzoic acid or the like.

The lactam may be ε-caprolactam, enantolactam, capryl lactam, undecane lactam, lauryl lactam, α-pyrrolidone, α-piperidone or the like.

The carboxylic acid may be adipic acid, glutaric acid, pimelic acid, suberic acid, azelaic acid, sebacic acid, undecanedioic acid, dodecadioic acid, hexadecadioic acid, hexadecenedioic acid, eicosandioic acid, eicosadienedioic acid, diglycolic acid, 2,2,4-trimethyladipic acid, xylylene dicarboxylic acid, 1,4-cyclohexanedicarboxylic acid, terephthalic acid, isophthalic acid, 2-chloroterephthalic acid, 2-methylterephthalic acid, 5-methylisophthalic acid 5-sodium sulfoisophthalic acid, hexahydroterephthalic acid, hexahydroisophthalic acid or the like.

The diamine may be hexamethylene diamine, tetramethylene diamine, nonamethylene diamine, undecamethylene diamine, dodecamethylene diamine, 2,2,4-trimethylhexamethylene diamine, 2,4,4-trimethylhexamethylene diamine, bis-(4,4'-aminocyclohexyl) methane, metaxylylenediamine, terephthaldiamine or the like.

In view of its excellent balance between strength characteristics and moldability, the polyamide A is preferably at least one selected from the group consisting of polyamide 6, polyamide 66, polyamide 46, polyamide 11, polyamide 12, polyamide 9T, polyamide 610, polyamide 612, polyamide 6/66 copolymer, polyamide 6/66/610 copolymer, polyamide 6T, polyamide 6I and polyamide MXD6. Polyamide 6, polyamide 66, polyamide 12, polyamide 9T and polyamide 6T are more preferred, and polyamide 6 is particularly preferred.

(Fluororesin B)

The fluororesin B has at least one type of a functional group (hereinafter referred to as "adhesive functional group") selected from the group consisting of a carbonyl group-containing group, a hydroxy group, an epoxy group and an isocyanate group. As the fluororesin B, one type may be used alone, or two or more types may be used in combination.

The adhesive functional group is preferably present as one or both of a terminal group of the main chain and a pendant group of the main chain of the fluororesin B, from the viewpoint that the moldability at the time of melting the resin composition and the impregnation property into the reinforcing fiber sheet are further excellent. The adhesive functional group may be one type or two or more types.

The fluororesin B preferably has at least a carbonyl group-containing group as the adhesive functional group, from the viewpoint that the moldability at the time of melting the resin composition and the impregnation property into the reinforcing fiber sheet are further excellent.

The carbonyl group-containing group may be a group having a carbonyl group between carbon atoms of a hydrocarbon group, a carbonate group, a carboxy group, a haloformyl group, an alkoxycarbonyl group, an acid anhydride group or the like.

The hydrocarbon group in the group having a carbonyl group between carbon atoms of the hydrocarbon group may be a $C_{2-8}$ alkylene group or the like. The number of carbon atoms in the alkylene group is the number of carbons in a state where the carbon constituting the carbonyl group is not included. The alkylene group may be linear or branched.

The haloformyl group is represented by —C(=O)—X (wherein X is a halogen atom). The halogen atom in the haloformyl group may be a fluorine atom, a chlorine atom or the like, and a fluorine atom is preferred.

The alkoxy group in the alkoxycarbonyl group may be linear or branched, and is preferably a $C_{1-8}$ alkoxy group, more preferably a methoxy group or an ethoxy group.

The content of the adhesive functional group in the fluororesin B is preferably from 10 to 60,000, more preferably from 100 to 50,000, still more preferably from 100 to 10,000, particularly preferably from 300 to 5,000, with respect to $1 \times 10^6$ carbon atoms in the main chain of the fluororesin B. When the content is at least the lower limit value in the above range, the moldability at the time of melting the resin composition and the impregnation property into the reinforcing fiber sheet are remarkably excellent. When the content is at most the upper limit value in the above range, it is possible to produce the resin composition, the molded product, the prepreg, and the fiber-reinforced molded product without using a high temperature condition.

The content of the adhesive functional group can be measured by a method such as nuclear magnetic resonance (NMR) analysis or infrared absorption spectrum analysis. For example, the proportion (mol %) of units having the adhesive functional group in all units constituting the fluororesin B can be obtained in accordance with a method such as infrared absorption spectrum analysis as described in JP-A-2007-314720. From this proportion, the content of the adhesive functional group can be calculated.

The melting point of the fluororesin B is from 100 to 325° C., preferably from 120 to 315° C., more preferably from 150 to 310° C. When the melting point is at least the lower limit value in the above range, the heat resistance of the molded product, prepreg, and fiber reinforced molded product is excellent. When the melting point is at most the upper limit value in the above range, a usual apparatus can be used to produce the resin composition, the molded product, the prepreg, or the fiber reinforced molded product.

The melting point of the fluororesin B can be adjusted by the type of units constituting the fluororesin B, the ratio of the units, the molecular weight of the fluororesin B, or the like. For example, the melting point tends to increase as the proportion of the unit u1 as described below increases.

As the fluororesin B, a melt-processable resin is used from the viewpoint that it is easy to produce the resin composition, the molded product, the prepreg, and the fiber-reinforced molded product.

The fluororesin B that is melt-processable may, for example, be a fluororesin in which the adhesive functional group is introduced into a known melt-processable fluororesin (for example, tetrafluoroethylene-fluoroalkyl vinyl ether copolymer, tetrafluoroethylene-hexafluoropropylene copolymer, ethylene-tetrafluoroethylene copolymer, polyvinylidene fluoride, polychlorotrifluoroethylene, ethylene-chlorotrifluoroethylene copolymer, or the like).

The fluororesin B may be one in which a temperature at which the melt flow rate becomes to be from 0.1 to 1,000 g/10 min., is present at a temperature higher by at least 20° C. than the melting point of the fluororesin B under a load of 49N or 21.2N.

For example, in the case of the fluororesin B having the melting point of from 150 to 200° C., it is preferably measured at a temperature that is higher by at least 20° C. than the melting point of the fluororesin B and is from 170 to 260° C. The load is preferably 21.2N.

Further, for example, in the case of the fluororesin B having the melting point of from 220 to 310° C., it is preferably measured at a temperature that is higher by at least 20° C. than the melting point of the fluororesin B and is from 240 to 380° C. The load is preferably 49N.

The melt flow rate, the melt flow rate of the melting point of the fluororesin B, is preferably from 0.5 to 100 g/10 min., more preferably from 1 to 30 g/10 min., further preferably from 5 to 20 g/10 min. When the melt flow rate is at least the lower limit value in the above range, the moldability of the fluororesin B is excellent. When the melt flow rate is at most the upper limit value in the above range, the mechanical properties of the molded product, prepreg, and fiber-reinforced molded product are excellent.

As the fluororesin B, the following may be mentioned depending on the production method.

A fluorinated polymer (hereinafter, referred to also as "fluorinated polymer B1") having an adhesive functional group derived from at least one selected from the group consisting of a monomer, a chain transfer agent and a polymerization initiator used in the production of the fluorinated polymer.

A fluororesin in which an adhesive functional group is introduced into a fluororesin that does not have an adhesive functional group by surface treatment such as corona discharge treatment or plasma treatment.

A fluororesin obtained by graft polymerization of a monomer having an adhesive functional group with a fluororesin having no adhesive functional group.

The fluororesin B is preferably the fluorinated polymer B1 for the following reasons.

In the fluorinated polymer B1, there is an adhesive functional group in either one or both of a terminal group of the main chain and a pendant group of the main chain in the fluorinated polymer B1, whereby the moldability at the time of melting the resin composition is remarkably excellent.

The adhesive functional group introduced to the fluororesin by surface treatment is unstable and tends to disappear as time passes.

When the adhesive functional group in the fluorinated polymer B1 is derived from a monomer used for the production of the fluorinated polymer B1, the fluorinated polymer B1 can be produced by the following method 1. In this case, the adhesive functional group is present in a unit based on the monomer.

Method 1: A monomer having an adhesive functional group is used for the production of the fluorinated polymer B1 by polymerization of the monomer.

When the adhesive functional group in the fluorinated polymer B1 is derived from a chain transfer agent used for the production of the fluorinated polymer B1, the fluorinated polymer B1 can be produced by the following method 2. In this case, the adhesive functional group is present as a terminal group of the main chain of the fluorinated polymer B1.

Method 2: The fluorinated polymer B1 is produced by polymerizing monomers in the presence of a chain transfer agent having an adhesive functional group.

The chain transfer agent having an adhesive functional group may be acetic acid, acetic anhydride, methyl acetate, ethylene glycol, propylene glycol or the like.

When the adhesive functional group in the fluorinated polymer B1 is derived from a polymerization initiator used for the production of the fluorinated polymer B1, the fluorinated polymer B1 can be produced by the following method 3. In this case, the adhesive functional group is present as a terminal group of the main chain of the fluorinated polymer B1.

Method 3: The fluorinated polymer B1 is produced by polymerizing monomers in the presence of a polymerization initiator such as a radical polymerization initiator having the adhesive functional group.

The radical polymerization initiator having the adhesive functional group may be di-n-propyl peroxydicarbonate, diisopropyl peroxycarbonate, tert-butylperoxyisopropyl carbonate, bis(4-tert-butylcyclohexyl) peroxydicarbonate, di-2-ethylhexyl peroxydicarbonate or the like.

When the adhesive functional group in the fluorinated polymer B1 is derived from at least two selected from the a monomer, a chain transfer agent, and a polymerization initiator used in the production of the fluorinated polymer B1, the fluorinated polymer B1 can be produced by using at least two selected from the above methods 1 to 3.

The fluorinated polymer B1 may be preferably the one which has the adhesive functional group derived from a monomer and which is produced by the method 1, from the viewpoint that the content of the adhesive functional group can be easily controlled and the impact resistance of the fiber-reinforced molded product can be easily adjusted.

The monomer having an adhesive functional group may be a monomer having a carboxy group (for example, maleic acid, itaconic acid, citraconic acid, undecylenic acid, etc.), a monomer having an acid anhydride group (for example, itaconic anhydride (hereinafter, referred to also as "IAH"), citraconic anhydride (hereinafter, referred to also as "CAH"), 5-norbornene-2,3-dicarboxylic anhydride (hereinafter, referred to also as "NAH"), maleic anhydride, etc.), a monomer having a hydroxy group and an epoxy group (for example, hydroxybutyl vinyl ether, glycidyl vinyl ether, etc.).

The fluorinated polymer B1 having an adhesive functional group derived from a monomer is particularly preferably the following fluorinated polymer B1 from the viewpoint that the moldability at the time of melting the resin composition is remarkably excellent.

A fluorinated polymer B1 having a unit u1 based on tetrafluoroethylene (hereinafter, referred to also as "TFE") or chlorotrifluoroethylene (hereinafter, referred to also as "CTFE"), a unit u2 based on an acid anhydride group-containing cyclic monomer, and a unit u3 based on a fluorinated monomer (excluding TFE and CTFE).

Here, the acid anhydride group of the unit u2 corresponds to the adhesive functional group.

The acid anhydride group-containing cyclic monomer constituting the unit u2 may be IAH, CAH, NAH, maleic anhydride or the like. As the acid anhydride group-containing cyclic monomer, one type may be used alone, or two or more types may be used in combination.

The acid anhydride group-containing cyclic monomer is preferably at least one selected from the group consisting of IAH, CAH and NAH. In such a case, the fluorinated polymer B1 having an acid anhydride group can be easily produced without using a specific polymerization method that is required when maleic anhydride is used (see JP-A-H11-193312).

The acid anhydride group-containing cyclic monomer may be preferably IAH or NAH from the viewpoint that the moldability at the time of melting the resin composition is remarkably excellent.

The fluorinated monomer constituting the unit (u3) is preferably a fluorinated compound having one polymerizable carbon-carbon double bond. The fluorinated compound may, for example, be a fluoroolefin (vinyl fluoride, vinylidene fluoride, trifluoroethylene, hexafluoropropylene (hereinafter, referred to also as "HFP"), hexafluoroisobutylene, etc., but excluding TFE), $CF_2=CFOR^{f1}$ (wherein $R^{f1}$ is a $C_{1-10}$ perfluoroalkyl group which may contain an oxygen atom between carbon atoms) (hereinafter referred to also as "PAVE"), $CF_2=CFOR^{f2}SO_2X^1$ (wherein $R^{f2}$ is a $C_{1-10}$ perfluoroalkylene group which may have an oxygen atom between carbon atoms, and $X^1$ is a halogen atom or a hydroxy group), $CF_2=CFOR^{f3}CO_2X^2$ (wherein $R^{f3}$ is a $C_{1-10}$ perfluoroalkylene group which may contain an oxygen atom between carbon atoms, and $X^2$ is a hydrogen atom or a $C_{1-3}$ alkyl group), $CF_2=CF(CF_2)_pOCF=CF_2$ (wherein p is 1 or 2), $CH_2=CX^3(CF_2)_qX^4$ (wherein $X_3$ is a hydrogen atom or a fluorine atom, q is an integer of from 2 to 10, and $X^4$ is a hydrogen atom or a fluorine atom) (hereinafter referred to also as "FAE"), a fluorinated monomer having a ring structure (perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.), or the like.

The fluorinated monomer is preferably at least one selected from the group consisting of HFP, PAVE and FAE, more preferably either one or both of FAE and HFP, from such a viewpoint that the moldability of the fluorinated polymer B1 is excellent.

PAVE may be $CF_2=CFOCF_2CF_3$, $CF_2=CFOCF_2CF_2CF_3$ (hereinafter, referred to also as "PPVE"), $CF_2=CFOCF_2CF_2CF_2CF_3$, $CF_2=CFO(CF_2)_6F$, or the like, and PPVE is preferred.

FAE may be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_6F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_6H$, $CH_2=CH(CF_2)_2F$ (hereinafter, referred to as "PFEE"), $CH_2=CH(CF_2)_3F$, $CH_2=CH(CF_2)_4F$ (hereinafter, referred to as "PFBE"), $CH_2=CH(CF_2)_5F$, $CH_2=CH(CF_2)_6F$, $CH_2=CH(CF_2)_2H$, $CH_2=CH(CF_2)_3H$, $CH_2=CH(CF_2)_4H$, $CH_2=CH(CF_2)_5H$, $CH_2=CH(CF_2)_6H$, or the like As FAE, preferred is $CH_2=CH(CF_2)_{q1}X^4$ (wherein q1 is from 2 to 6, preferably from 2 to 4), more preferred is PFEE, $CH_2=CH(CF_2)_3F$, PFBE, $CH_2=CF(CF_2)_3H$ or $CH_2=CF(CF_2)_4H$, and particularly preferred is PFEE or PFBE.

The fluorinated polymer B1 may have a unit u4 based on a non-fluorine monomer (excluding an acid anhydride group-containing cyclic monomer) in addition to the units u1 to u3.

The non-fluorine monomer is preferably a compound having one polymerizable carbon-carbon double bond. The non-fluorine monomer may be an olefin (ethylene, propylene, 1-butene, etc.), a vinyl ester (vinyl acetate, etc.) or the like. As the non-fluorine monomer, one type may be used alone, or two or more types may be used in combination.

The non-fluorine monomer is preferably ethylene, propylene, or 1-butene, more preferably ethylene from such a viewpoint that the moldability at the time of melting the resin composition is further improved.

When the unit u4 is an ethylene unit (hereinafter, referred to also as "E unit"), the preferred proportions of the respective units are as follows.

The proportion of the unit u1 is preferably from 25 to 79.79 mol %, more preferably from 40 to 64.47 mol %, furthermore preferably from 45 to 61.95 mol % in the total of the units u1, u2, u3 and u4.

The proportion of the unit u2 is preferably from 0.01 to 5 mol %, more preferably from 0.03 to 3 mol %, furthermore preferably from 0.05 to 1 mol % in the total of the units u1, u2, u3 and u4.

The proportion of the unit u3 is preferably from 0.2 to 20 mol %, more preferably from 0.5 to 15 mol %, furthermore preferably from 1 to 12 mol % in the total of the units u1, u2, u3, and u4.

The proportion of the unit u4 is preferably from 20 to 74.79 mol %, more preferably 35 to 50 mol %, furthermore preferably from 37 to 53.95 mol % in the total of the units u1 to u4.

The preferred proportions of the respective units when it does not have the unit u4 are as follows.

The proportion of the unit u1 is preferably from 50 to 99.89 mol %, more preferably from 50 to 99.4 mol %, further preferably from 50 to 98.9 mol % in the total of the units u1, u2 and u3.

The proportion of the unit u2 is preferably from 0.01 to 5 mol %, more preferably from 0.1 to 3 mol %, further preferably from 0.1 to 2 mol % in the total of the units u1, u2 and u3.

The proportion of the unit u3 is preferably from 0.1 to 49.99 mol %, more preferably from 0.5 to 49.9 mol %, further preferably from 1 to 49.9 mol % in the total of the units u1, u2 and u3.

When the proportions of the respective units are within the above ranges, the molded product, prepreg, and fiber-reinforced molded product are remarkably excellent in the flame retardancy and chemical resistance.

When the proportion of the unit u2 is within the above range, the amount of the acid anhydride group in the fluorinated polymer B1 is appropriate, and the moldability at the time of melting the resin composition is remarkably excellent.

When the proportion of the unit u3 is within the above range, the moldability of the fluorinated polymer B1 is remarkably excellent.

The proportions of the respective units can be calculated by melt NMR analysis, fluorine content analysis, infrared absorption spectrum analysis, etc. of the fluorinated polymer B1.

In the fluorinated polymer B1, a part of the acid anhydride group in the unit u2 is hydrolyzed, and as a result, a unit based on a dicarboxylic acid corresponding to the acid anhydride group-containing cyclic monomer (such as itaconic acid, citraconic acid, 5-norbornene-2,3-dicarboxylic acid, or maleic acid) may be included. When the unit based on a dicarboxylic acid is included, the proportion of the unit is encompassed in the proportion of the unit u2.

The preferred examples of the fluorinated polymer B1 may be the following.

A copolymer having a TFE unit, a NAH unit and a PPVE unit;

A copolymer having a TFE unit, a IAH unit and a PPVE unit,

A copolymer having a TFE unit, a CAH unit and a PPVE unit,

A copolymer having a TFE unit, a IAH unit and a HFP unit;

A copolymer having a TFE unit, a CAH unit and a HFP unit;

A copolymer having a TFE unit, a IAH unit, a PFBE unit, and a E unit;

A copolymer having a TFE unit, a CAH unit, a PFBE unit, and a E unit;

A copolymer having a TFE unit, a IAH unit, a PFEE unit, and a E unit;

A copolymer having a TFE unit, a CAH unit, a PFEE unit, and a E unit;

A copolymer having a TFE unit, a IAH unit, a HFP unit, a PFBE unit, and a E unit.

The fluororesin B can be produced by a conventional method. In a case where the fluororesin B is produced by polymerization of monomers, the polymerization method is preferably the one using a radical polymerization initiator.

The polymerization method may be a bulk polymerization method, a solution polymerization method using an organic solvent (a fluorinated hydrocarbon, a chlorinated hydrocarbon, a fluorinated chlorohydrocarbon, an alcohol, a hydrocarbon, etc.), a suspension polymerization method using an aqueous medium and an appropriate organic solvent when necessary, an emulsion polymerization method using an aqueous medium and an emulsifier. A solution polymerization method is preferred.

(Other Components)

Other components may be other thermoplastic resins other than the polyamide A and the fluororesin B, an inorganic filler, an organic filler, an organic pigment, a metal soap, a surfactant, an ultraviolet absorber, a lubricant, a silane coupling agent, an organic compound (an organic monomer, an organic oligomer having a polymerization degree of at most 50, etc.), or the like.

Said other thermoplastic resins may be polyesters (polyethylene terephthalate, polybutylene terephthalate, polytrimethylene terephthalate, polyethylene naphthalate, liquid crystal polyester, etc.), polyolefins (polyethylene, polypropylene, polybutylene, acid-modified polyethylene, acid-modified polypropylene, acid-modified polybutylene, etc.), polyoxymethylenes, polyamides other than the polyamide A, polyarylene sulfide resins (polyphenylene sulfide, etc.), polyketones, polyetherketones, polyetheretherketones, polyetherketoneketones, polyether nitriles, fluororesins other than the fluororesin B (polytetrafluoroethylene, etc.), liquid crystal polymers, styrene resins (polystyrene, an acrylonitrile styrene resin, an acrylonitrile butadiene styrene resin, etc.), polycarbonates, polymethyl methacrylates, polyvinyl chlorides, unmodified or modified polyphenylene ethers, thermoplastic polyimides, polyamideimides, polyetherimides, polysulfones, polyethersulfones, polyarylates, polystyrene elastomers, polyolefin elastomers, polyurethane elastomers, polyester elastomers, polyamide elastomers, polybutadiene elastomers, polyisoprene elastomers, fluorine elastomers (except for the fluororesin B), acrylonitrile elastomers, or the like.

The inorganic filler may be silica, clay, talc, calcium carbonate, mica, diatomaceous earth, alumina, zinc oxide, titanium oxide, calcium oxide, magnesium oxide, iron oxide, tin oxide, antimony oxide, calcium hydroxide, magnesium hydroxide, aluminum hydroxide, basic magnesium carbonate, magnesium carbonate, zinc carbonate, barium carbonate, dosonite, hydrotalcite, calcium sulfate, barium sulfate, calcium silicate, montmorillonite, bentonite, activated clay, sepiolite, imogolite, sericite, glass fiber, glass bead, silica balloon, carbon black, carbon nanotube, carbon nanohorn, graphite, carbon fiber, glass balloon, carbon burn, wood powder, zinc borate, or the like. As the inorganic filler, one type may be used alone, or two or more types may be used in combination.

The inorganic filler may be subjected to surface treatment by a surface treatment agent such as a silane coupling agent or a titanate coupling agent from the viewpoint of improving dispersibility in the resin.

The organic filler may be an aromatic polyamide fiber, a polyaramid fiber, a polyparaphenylene benzoxazole (PBO) fiber, a polyphenylene sulfide fiber, a polyester fiber, an acrylic fiber, a nylon fiber, a polyethylene fiber, or the like.

(Resin Composition)

The proportion of the polyamide A is preferably more than 30% by volume and at most 99% by volume, more preferably from 40 to 97% by volume, still more preferably from 55 to 95% by volume, furthermore preferably from 60 to 92% by volume, particularly preferably from 70 to 90% by volume, in the total of the polyamide A and the fluororesin B. When the proportion of the polyamide A is at least the lower limit value in the above range, it is easy to form a sea-island structure consisting of a sea part containing the polyamide A and an island part containing the fluororesin B. When the proportion of the polyamide A is at most the upper limit value in the above range, the moldability at the time of melting the resin composition is further improved.

The proportion of the fluororesin B is preferably at least 1% by volume and less than 70% by volume, more preferably from 3 to 60% by volume, still more preferably from 5 to 45 mass %, furthermore preferably from 8 to 40% by volume, particularly preferably from 10 to 30% by volume, in the total of the polyamide A and the fluororesin B. When the proportion of the fluororesin B is at least the lower limit value in the above range, the moldability at the time of melting the resin composition is further improved. When the proportion of the fluororesin B is at most the upper limit value in the above range, it is easy to form a sea-island structure consisting a sea part containing the polyamide A and an island part containing the fluororesin B.

The total proportion of the polyamide A and the fluororesin B is preferably from 80 to 100 mass %, more preferably from 85 to 100 mass %, still more preferably from 90 to 100 mass % in the resin composition of the present invention. When the total proportion of the polyamide A and the fluororesin B is within the above range, the effects of the present invention are not easily impaired.

The total proportion of other components is preferably from 0 to 20 mass %, more preferably from 0 to 15 mass %, further preferably from 0 to 10 mass % in the resin composition of the present invention. When the total proportion of other components is within the above range, the effects of the present invention are not easily impaired.

In a case where the polyamide A is polyamide 6, the melt flow rate of the resin composition measured at a temperature of 260° C. under a load of 21.2N (2.16 kg) is preferably from 20 to 150 g/10 min., more preferably from 20 to 140 g/10 min., still more preferably from 20 to 100 g/10 min., furthermore preferably from 25 to 90 g/10 min. When the melt flow rate is at least the lower limit value in the above range, the impregnation property into the reinforcing fiber sheet is further improved. When the melt flow rate is at most the upper limit value in the above range, the resin composition can be easily molded into a film, fiber or the like.

In a case where the polyamide A is other than the polyamide 6, the melt flow rate of the resin composition is preferably in a range corresponding to a case where the polyamide A is the polyamide 6 from the viewpoint of the moldability and impregnability of the resin composition of the present invention.

In addition, in a case where the polyamide A is polyamide 12, it is preferably measured at a temperature of 250° C.

under a load of 21.2N (2.16 kg). The melt flow rate of the resin composition is preferably from 20 to 120 g/10 min., more preferably from 30 to 100 g/10 min., still more preferably from 40 to 90 g/10 min., further preferably from 40 to 70 g/10 min.

The resin composition of the present invention can be produced, for example, by mixing the respective components in advance using various mixers such as a tumbler and a Henschel mixer, followed by melt-blending with a banbury mixer, a roll, a brabender, a single screw extruder, a twin screw extruder, a kneader or the like.

Since the resin composition of the present invention described above contains the polyamide A having a low viscosity number, it is excellent in the impregnation into the reinforcing fiber sheet.

Further, the resin composition of the present invention can be molded into a film, a fiber, etc., even though it contains the polyamide having a low viscosity number, by reacting or associating an amide group of the polyamide A and the adhesive functional group of the fluororesin B. Moreover, the impregnation property into the reinforcing fiber sheet is further excellent.

Further, the resin composition of the present invention contains the fluororesin B having the adhesive functional group and is excellent in the impregnation into the reinforcing fiber sheet, and thus the fiber-reinforced molded product having excellent impact resistance can be obtained.

<Molded Product>

The molded product of the present invention is made of the resin composition of the present invention.

The molded product of the present invention is used as a material that is laminated with a reinforcing fiber sheet, melted and then impregnated into the reinforcing fiber sheet, in the production of the prepreg.

The form of the molded product of the present invention may be a film, a fiber, etc.

The film can be produced, for example, by extruding the resin composition of the present invention into a film shape by using a T die or a circular die. Moreover, the film can be produced by directly putting the resin composition in an extruder provided with a T die or a circular die, after the polyamide A and the fluororesin B are mixed.

The fiber can be produced, for example, by extruding the resin composition of the present invention into a fiber from a nozzle. The fiber may be stretched in order to obtain a small-diameter fiber. Moreover, the film can produced by directly putting the resin composition in an extruder provided with a nozzle, after the polyamide A and the fluororesin B are mixed.

The molded product of the present invention as described above is a molded product made of the resin composition of the present invention, and thus the impregnation property into the reinforcing fiber sheet is excellent. In addition, the fiber-reinforced molded product having excellent impact resistance can be obtained.

<Prepreg>

The prepreg of the present invention comprises the resin composition of the present invention and a reinforcing fiber. Specifically, it is a sheet-shape material obtained by impregnating the resin composition of the present invention in the reinforcing fiber sheet. In the sheet-shape material, the reinforcing fiber sheet is embedded in a matrix resin made of the resin composition of the present invention The phrase "impregnating the resin composition" is not limited to the case of directly impregnating the resin composition of the present invention obtained by the above melt-blending, but encompasses the case of impregnating the molded product (such as a film) made of the resin composition in the reinforcing fiber sheet. When the film, etc. is impregnated, the prepreg of the present invention contains the resin composition of the present invention as a matrix resin.

As the reinforcing fiber, a continuous long fiber having a length of at least 10 mm is preferred from the viewpoint of the mechanical property of the fiber-reinforced molded product. It is not necessary for the reinforcing fiber to be continuous over the entire length in the length direction or the entire width in the width direction of the reinforcing fiber sheet, and the reinforcing fiber may be divided in the middle.

As the form of the reinforcing fiber, a reinforcing fiber sheet processed into a sheet shape is preferred from the viewpoint of the mechanical property of the fiber-reinforced molded product.

The reinforcing fiber sheet may be a reinforcing fiber bundle made of a plurality of reinforcing fibers, a cloth made by weaving reinforcing fiber bundles, a unidirectional reinforcing fiber bundle in which a plurality of reinforcing fibers are aligned in one direction, a unidirectional cloth made of unidirectional reinforcing fiber bundles, a combination of these, a stack of a plurality of reinforcing fiber bundles, or the like.

The reinforcing fiber may be an inorganic fiber, a metal fiber, an organic fiber or the like.

The inorganic fiber may be a carbon fiber, a graphite fiber, a glass fiber, a silicon carbide fiber, a silicon nitride fiber, an alumina fiber, a silicon carbide fiber, a boron fiber, or the like.

The metal fiber may be an aluminum fiber, a brass fiber, a stainless fiber, or the like.

The organic fiber may be an aromatic polyamide fiber, a polyaramid fiber, a polyparaphenylene benzoxazole (PBO) fiber, a polyphenylene sulfide fiber, a polyester fiber, an acrylic fiber, a nylon fiber, a polyethylene fiber, or the like.

The reinforcing fiber may be subjected to surface treatment. As the reinforcing fiber, one type may be used alone, or two or more types may be used in combination. The reinforcing fiber is preferably a carbon fiber from the viewpoint of low specific gravity, high strength and high elastic modulus.

The carbon fiber may, for example, be those described in WO 2013/129169. In particular, the carbon fiber is preferably those described in paragraphs 0018 to 0026. In addition, a method for producing the carbon fiber may be the one described in paragraphs 0028 to 0033.

The reinforcing fiber may be a woven fabric made of reinforcing fiber bundles, a knitted fabric, a unidirectional reinforcing fiber bundle in which a plurality of reinforcing fibers are aligned in one direction, a unidirectional sheet made of the unidirectional reinforcing fiber bundle, a combination of these, a stack of a plurality of reinforcing fiber bundles, a non-crimp fabric, or the like. The warp and weft constituting the woven fabric may be orthogonal or may not be orthogonal.

It is preferred that the reinforcing fiber is a spread reinforcing fiber. "Spreading" is a process of flattening and spreading a plurality of fiber bundles. The spread reinforced fiber improves the impregnation of the resin, and the fiber-reinforced molded product having better mechanical properties can be obtained. The spreading method is disclosed in Japanese Patent No. 2983531, Japanese Patent No. 3049225, Japanese Patent No. 3064019, or the like.

The surface of the reinforcing fiber is subjected to coating (also referred to as sizing) to facilitate the handling of the fiber. In the present invention, either the coated reinforcing fiber or the reinforcing fiber from which the coating agent has been removed may be used.

The prepreg of the present invention can be produced, for example, by impregnating the resin composition of the present invention in the reinforcing fiber sheet. The reinforcing fiber sheet may be a reinforcing fiber fabric, a knitted fabric, or a unidirectional sheet arranged in one direction.

The method for producing the prepreg of the present invention may, for example, be the following method.

A method in which a film made of the resin composition of the present invention is heated and melted at a temperature of at least the melting point of the resin composition in the presence of the reinforcing fiber sheet, and then the resin composition is impregnated in the reinforcing fiber sheet.

A method in which a fiber made of the resin composition of the present invention and a reinforcing fiber are used to produce a fabric, and then the fabric is heated to a temperature of at least the melting point of the resin composition to melt the fiber made of the resin composition and the resin composition is impregnated in the reinforcing fiber sheet.

The prepreg of the present invention as described above contains the resin composition of the present invention as a matrix resin, and thus the resin composition is sufficiently impregnated in the reinforcing fiber sheet. In addition, the fiber-reinforced molded product having excellent impact resistance can be obtained.

<Fiber-Reinforced Molded Product>

The fiber-reinforced molded product of the present invention is formed by molding the prepreg of the present invention.

The fiber-reinforced molded product of the present invention may be formed by molding only the prepreg of the present invention, or may be a laminate formed by molding the prepreg of the present invention and other prepregs. It may be a laminate of those formed by molding the prepreg of the present invention and other prepregs if necessary, and components other than the prepreg.

The other prepregs may be a prepreg in which the matrix resin does not contain the polyamide A and the fluororesin B, a prepreg in which the matrix resin contains the fluororesin B, but does not contain the polyamide A, a prepreg in which the matrix resin contains polyamide A, but does not contain the fluororesin B, or the like.

The components other than the prepreg may be a metal member, a resin film containing the polyamide A, a resin film containing the fluororesin B, a film containing another thermoplastic resin.

The metal member may be a metal foil, various metal product parts, or the like. The metal may be iron, stainless steel, aluminum, copper, brass, nickel, zinc or the like. The shape of the metal member can be appropriately selected according to the fiber-reinforced molded product as desired.

The fiber-reinforced molded product of the present invention can be produced, for example, by heating and molding a laminate obtained by laminating only one type of the prepreg of the present invention, or at least two types of the prepreg of the present invention. It can also be produced, for example, by heating and molding a laminate obtained by laminating at least one type of the prepreg of the present invention, and one or both of other prepregs and other components other than the prepreg.

The molding method may be a press molding method using a mold.

The fiber-reinforced molded product of the present invention can be molded by a method that does not use the prepreg of the present invention. For example, the fiber-reinforced molded product of the present invention can be obtained by laminating a reinforcing fiber sheet and a film made of the resin composition of the present invention in a mold, followed by heating and pressing. In a case where the reinforcing fiber sheet is A and the film made of the resin composition of the present invention is B, the above lamination may be alternately laminated in an order such as ABABAB, or may be laminated in an irregular order such as AABAABB. Moreover, the above lamination may be laminated in a regular order such as BABBABBAB combined with BAB.

The temperature for heating and pressing is preferably at least the melting point of the resin composition of the present invention or at least the melting point of the resins (i.e. the polyamide A or the fluororesin B) which are the main components of the resin composition.

The fiber-reinforced molded product of the present invention can be molded by winding the prepreg having a tape shape (also referred to as a UD tape) around a mold (metal, wood, etc.) or a molded product made of a resin, a metal, etc., followed by heat welding (and pressuring if necessary).

In addition, it can be molded by laminating a chopped sheet (also referred to as a chopped tape, a chopped UD tape, etc.), which is obtained by cutting the prepreg of the present invention (including the UD tape) into a strip shape, in a mold, followed by heat welding (and pressuring if necessary).

The chopped sheet may be laminated randomly, or may be laminated while changing the direction of the fiber for each part. In a case where an isotropic fiber-reinforced molded product is to be obtained, it is preferably laminated randomly. In a case where the strength is to be partially changed, it is desirable to change the direction of the fiber for each portion.

As applications of the fiber-reinforced molded product, the following ones may be mentioned.

Housings for electrical and electronic equipment (personal computers, displays, OA equipment, mobile phones, personal digital assistants, facsimiles, compact discs, portable MD, portable radio cassettes, PDA (portable information terminals such as electronic organizers), video cameras, digital still cameras, optical device, audio, air-conditioning, lighting, entertainment goods, toys goods, other household appliances, etc.), inner members (trays, chassis, etc.), cases for inner members, mechanical parts, etc. Building materials (panels), etc.

Automobile, motorcycle related parts, members and outer plates: motor parts, alternator terminals, alternator connectors, IC regulators, potentiometer for light deer base, suspension parts, various valves (exhaust gas valves, etc.), fuel-related, exhaust system or intake system various pipes, air intake nozzle snorkels, intake manifolds, various arms, various frames, various hinges, various bearings, fuel pumps, gasoline tanks, CNG tanks, engine cooling water joints, carburetor main body, carburetor spacers, exhaust gas sensors, coolant sensors, oil temperature sensors, brake pad wear sensors, throttle position sensors, crankshaft position sensors, air flow meters, brake pad wear sensors, air conditioning thermostat base, heating warm air flow control valves, brush holders for radiator motors, water pump impellers, turbine vanes, wiper motor-related parts, distributors, starter switches, starter relays, transmission wire harnesses, window washer nozzles, air conditioner panel switch boards, coils for fuel-related magnetic valves, fuse connectors, battery trays, AT brackets, head lamp supports, pedal housings, steering wheels, door beams, protectors, chassis, frames, arm rests, horn terminals, step motor rotors, lamp sockets, lamp reflectors, lamp housings, brake pistons, noise shield, radiator supports, spare tire covers, seat shells, solenoid bobbins, engine oil filters, ignition device cases, under covers, scuff plates, pillar trim, propeller shafts, wheels, fenders, fascia, bumpers, bumper beams, hoods, aero parts, platforms, cowl louvers, roofs, instrument panels, spoilers, various modules, etc.

Liquid hydrogen transports and storage tank members, speaker diaphragms.

Aircraft-related parts, members and outer plates: landing gear pods, winglets, spoilers, edges, ladders, elevators, failing, ribs, etc.

Other: blades of wind turbines, drone parts, etc.

The fiber-reinforced molded product of the present invention is preferably used particularly for aircraft components, sports equipment, windmill blades, automobile outer plates, automobile interiors, and housings, trays, chassis, etc. of electronic devices.

The fiber-reinforced molded product of the present invention as described above uses the prepreg of the present invention, so it has excellent impact resistance.

EXAMPLES

In the following, the present invention will be specifically described with reference to Examples, but the invention should not be construed as being limited thereto.
(Viscosity Number)

As for polyamide pellets, the viscosity number was measured using 96% sulfuric acid as a solvent in accordance with ISO 307: 2007 (corresponding to Japanese Industrial Standards JIS K 6933: 2013).
(Proportion of Unit in Fluorinated Polymer)

The proportion of the units in the fluorinated polymer was determined by melt NMR analysis, fluorine content analysis and infrared absorption spectrum analysis.
(Content of Adhesive Functional Group)

The proportion of the IAH unit in the fluoropolymer was determined by the following infrared absorption spectrum analysis.

A fluorinated polymer was press-molded to obtain a film having a thickness of 200 μm. In the infrared absorption spectrum, an absorption peak of the IAH unit in the fluorinated polymer appears at 1,778 $cm^{-1}$. The absorbance of this absorption peak was measured, and the proportion (mol %) of the IAH unit was determined using a molar extinction coefficient of IAH (i.e. 20,810 $mol^{-1} \cdot L \cdot cm^{-1}$).

When the proportion of the IAH unit is a (mol %), the number of adhesive functional groups (acid anhydride groups) per $1 \times 10^6$ carbon atoms in the main chain is calculated as [$a \times 10^6/100$].
(Melting Point)

Using a differential scanning calorimeter (made by Seiko Instruments, DSC-7020), the melting peak was recorded when the fluoropolymer or polyamide was heated at a rate of 10° C./min., and the temperature corresponding to the maximum value (° C.) was regarded as the melting point.
(Melt Flow Rate)

As for the fluorinated polymer, the mass (g) of the fluorinated polymer that flows out for 10 minutes from a nozzle having a diameter of 2 mm and a length of 8 mm under a condition of 250° C. and a load of 21.2N was measured by using a melt indexer (made by Techno Seven).

As for the resin composition, the mass (g) of the resin composition that flows out for 10 minutes from a nozzle having a diameter of 2 mm and a length of 8 mm under a condition of 260° C. and a load of 21.2N was measured by using a melt indexer (made by Techno Seven). Examples 10 and 11 and Comparative Examples 8, 9, 10 and 11 were measured at 250° C.
(Film Moldability (1))

As described in Examples 1 to 4 and Comparative Examples 1 to 4, the film was molded at a line rate of 2.0 m/min. or 4.0 m/min., and then the film moldability (1) of the resin composition was evaluated based on the following criteria.

⊚ (excellent): The resin composition can be stably molded into the film at both the winding rates.

○ (good): The resin composition can be molded into the film at both the winding rates. It can be stably molded at 2.0 m/min., but the molding is unstable at 4.0 m/min.

Δ (pass): The resin composition can be molded into the film at both the winding rates, but the molding is unstable.

x (fail): The resin composition cannot be molded into the film.
(Film Moldability (2))

As described in Examples 5 and 6 and Comparative Examples 5 to 7, the film was molded at the winding rate of 2.0 m/min., and then the film moldability (2) of the resin composition was evaluated based on the following criteria.

Pass: The resin composition can be molded into the film.

Fail: The resin composition cannot be molded into the film.
(Impregnation)

The impregnation property of the resin composition into the reinforcing fiber sheet was evaluated according to the following criteria using the melt flow rate of the resin composition.

○ (good): The melt flow rate of the resin composition is at least 20 g/10 min.

Δ (pass): The melt flow rate of the resin composition is at least 10 g/10 min. and less than 20 g/10 min.

x (fail): The melt flow rate of the resin composition is less than 10 g/10 min.
(Izod Impact Strength)

The laminate (the fiber-reinforced molded product produced in Examples and Comparative Examples) was cut using a contour machine (Amada Co., Ltd., V-400) to obtain a sample having a height of 63 mm and a width of 13 mm. A test piece was obtained by notching the sample at a height of 32 mm.

With respect to the test piece, the Izod impact strength was measured under the condition of a hammer capacity of 2.75 J, a hammer mass×gravity acceleration of 13.97N, a distance from the axis to the gravity center of 10.54 cm, and a distance from the axis to the impact point of 33.5 cm, by using an Izod test device (manufactured by Toyo Seiki Seisakusho Co., Ltd.).
(Tensile Strength)

The tensile strength was determined at a load cell rating of 5,000 kg, a distance between chucks of 110 mm, and a rate of 10 mm/min., by using TENSILON (made by TOYO BALDWIN CO., LTD., Model: UTM-5T).
(Bending Strength)

The bending strength was measured at a load cell rating of 1,000 kg, a rate of 5 mm/min., and a distance between fulcrums of 8 cm using a tensile and compression tester (made by Toyo Seiki Seisakusho, Strograph R-2).
(Polyamide)

Polyamide A-1: Polyamide 6 (made by Ube Industries, UBE nylon 1013B, viscosity number: 123), melting point 224° C.

Polyamide A'-2: Polyamide 6 (made by Ube Industries, UBE nylon 1022B, viscosity number: 196), melting point 224° C.

Polyamide A-3: Polyamide 12 (made by Ube Industries, UBESTA 3012U, viscosity number 155), melting point 180° C.

Polyamide A'-4: Polyamide 12 (made by Ube Industries, UBESTA 3030U, viscosity number 213), melting point 179° C.
(Fluororesin)

Fluorinated Polymer B-1:

A polymerization tank equipped with a stirrer having an internal volume of 430 L was degassed, and then 237.2 kg of 1-hydrotridecafluorohexane, 49.5 kg of 1,3-dichloro-1,1,2,2,3-pentafluoropropane (made by Asahi Glass Company, Limited, AK225cb (hereinafter referred to as "AK225cb")), 122 kg of HFP, and 1.31 kg of PFBE were charged. The temperature inside the polymerization tank was raised to 66°

C., and the pressure was raised to a 1.5 MPa [gauge] by a mixed gas of TFE and ethylene (TFE/ethylene=89/11 molar ratio). As the polymerization initiator, 2.5 L of a 1-hydrotridecafluorohexane solution containing 2 mass % of tert-butyl peroxypivalate was charged to initiate the polymerization. During the polymerization, a monomer mixed gas of TFE and ethylene (TFE/ethylene=54/46 molar ratio) was continuously charged so that the pressure was constant. Further, PFBE in an amount corresponding to 1 mol % of the total moles of TFE and ethylene charged during the polymerization, and IAH in an amount corresponding to 0.4 mol % of the total moles of TFE and ethylene were continuously charged. 9.3 hours after the start of polymerization, 29 kg of the monomer mixed gas was charged and then the temperature inside the polymerization tank was lowered to 25° C. and the polymerization tank was purged to normal pressure.

Table 1. In addition, the blend ratio shown in Table 1 is volume %, and was calculated by specifying the specific gravity of the polyamide as 1.14 and the specific gravity the fluororesin as 1.75.

Using a single resin extruder (made by Tanabe Plastics Machine Co., Ltd., VS-30) and a T die having a width of 400 mm, the obtained resin composition was subjected to extrusion molding at a resin temperature of 260° C., a rotation speed of 50 rpm, and a line speed of 2.0 m/min. or 4.0 m/min., and evaluated for the film moldability (1). The evaluation results are shown in Table 1.

Comparative Examples 1 and 2

Table 1 shows the evaluation results on the film formability (1) and impregnation for the polyamide A alone.

Table 1

| Blend (% by volume) | Comparative Example 1 | Example 1 | Example 2 | Example 3 | Example 4 | Comparative Example 2 | Comparative Example 3 | Comparative Example 4 |
|---|---|---|---|---|---|---|---|---|
| Polyamide A-1 | 100 | 95 | 90 | 80 | 70 | — | — | 95 |
| Fluorinated polymer B-1 | — | 5 | 10 | 20 | 30 | — | 10 | — |
| Fluorinated polymer B'-2 | — | — | — | — | — | — | — | 5 |
| Polyamide A'-2 | — | — | — | — | — | 100 | 90 | — |
| Melt flow rate (g/10 min.) | 110 | 81.1 | 77.9 | 43.5 | 27.5 | 16.6 | 6.3 | 105 |
| Film moldability (1) | X | ◯ | ◎ | ◎ | ◎ | ◎ | ◎ | X |
| Impregnation | — | ◯ | ◯ | ◯ | ◯ | Δ | X | — |

The obtained slurry-like fluorinated polymer B-1 was put into an 860 L of a granulation tank charged with 300 kg of water, and then was granulated while the temperature was raised to 105° C. with stirring and the solvent was removed by distillation. The obtained granulated product was dried at 150° C. for 15 hours to obtain 33.2 kg of a dry granulated product of the fluorinated polymer B-1.

The proportions of the respective monomer units in the fluorinated polymer B-1 were TFE unit/HFP unit/PFBE unit/IAH unit/E unit=46.2/9.4/1.0/0.4/43.0 molar ratio. The content of the adhesive functional group was 3,000 to $1 \times 10^6$ carbon atoms in the main chain of the fluorinated polymer B-1, and the melting point of the fluorinated polymer B-1 was 170° C. The melt flow rate (at 250° C. under a load of 21.2N) was 4.4 g/10 min.

Fluorinated polymer B'-2: ETFE having no adhesive functional group (LM-ETFE LM-730AP, made by Asahi Glass Company, Limited, melting point: 225° C., melt flow rate (297° C. and a load of 49N): 30 g/10 min.).

Fluorinated resin B-3: The fluorinated polymer B-3 was obtained by the same production method as in Example 1 of WO 2015/182702. The proportions of the respective units in the fluorinated resin B-3 were TFE unit/IAH unit/PFBE unit/E unit=58.5/0.1/2.4/39 molar ratio. The content of the adhesive functional group was 3,000 to $1 \times 10^6$ carbon atoms in the main chain of the fluorinated resin B-3, and the melting point of the fluorinated resin B-3 was 245° C. The melt flow rate (297° C. and a load of 49N) was 22 g/10 min.

Examples 1 to 4 and Comparative Examples 3 and 4

The polyamide and the fluororesin were dry-blended in the proportions as shown in Table 1 and charged into a twin screw extruder (made by Technobel, KZW15TW-45MG), and then were melt-blended under the following condition to obtain the resin composition: a throughput rate of 2.0 kg/hour, a screw rotation rate of 200 rpm, and a resin temperature of 240° C. The melt flow rate of the obtained resin composition was measured and the impregnation property was evaluated. The evaluation results are shown in Examples 5 and 6 and Comparative Examples 5, 6 and 7

The polyamide and the fluororesin were dry-blended in the proportions as shown in Table 2 and charged into a twin screw extruder (made by Technobel, KZW15TW-45MG), and then were melt-blended under the following condition to obtain the resin composition: a throughput rate of 2.0 kg/hour, a screw rotation rate of 200 rpm, and a resin temperature of 250° C. In addition, the blend ratio shown in Table 2 is volume %, and was calculated by specifying the specific gravity of the polyamide as 1.14 and the specific gravity of the fluororesin as 1.75.

Using a single screw extruder (made by Tanabe Plastics Machine Co., Ltd., VS-30) and a T die having a width of 400 mm, the obtained resin composition was subjected to extrusion molding at a resin temperature of 260° C., a rotation speed of 50 rpm, and a line speed of 2.0 m/min., and evaluated for the film moldability (2). The evaluation results are shown in Table 2.

The obtained film was cut into a 30 cm×30 cm square. The film and a carbon fiber cloth (made by Sunlight Co., Ltd., $CF_{3000}$) were laminated in the order of film, carbon fiber cloth and film, using a melt heat press machine (made by Tester Sangyo Co., Ltd.), and then were subjected to press molding under the condition of a temperature of 240° C., a pressure of 1 MPa, and a pressing time of 3 minutes, to obtain the prepreg.

10 sheets of the obtained prepreg were laminated and subjected to press molding, under the condition of a temperature of 260° C., a preheating of 10 minutes, a pressure of 10 MPa, and a pressing time of 5 minutes, using a melt heat press machine (made by Tester Sangyo Co., Ltd.), and then the fiber-reinforced molded product having a thickness of 2.5 mm was obtained.

The obtained fiber-reinforced molded product was measured for the Izod impact strength, tensile strength and bending strength. The results are shown in Table 2.

TABLE 2

| Blend (% by volume) | Example 5 | Example 6 | Comparative Example 5 | Comparative Example 6 | Comparative Example 7 |
|---|---|---|---|---|---|
| Polyamide A-1 | 80 | 70 | 100 | — | — |
| Fluorinated polymer B-3 | 20 | 30 | — | — | 20 |
| Polyamide A'-2 | — | — | — | 100 | 80 |
| Film moldability (2) | Pass | Pass | Fail | Pass | Pass |
| Izod impact strength (J/m) | 490 | 560 | — | 350 | 440 |
| Tensile strength (MPa) | 390 | 360 | — | 240 | 320 |
| Bending strength (MPa) | 500 | 360 | — | 130 | 240 |

Examples 7, 8 and 9

The polyamide and the fluororesin were dry-blended in the proportions as shown in Table 3 and charged into a twin screw extruder (made by Technobel, KZW15TW-45MG), and then were melt-blended under the following condition to obtain the resin composition: a throughput rate of 2.0 kg/hour, a screw rotation rate of 200 rpm, and a resin temperature of 250° C. In addition, the blend ratio shown in Table 2 is volume %, and was calculated by specifying the specific gravity of the polyamide as 1.14 and the specific gravity of the fluororesin as 1.75.

Using a single screw extruder (made by Tanabe Plastics Machine Co., Ltd., VS-30) and a T die having a width of 400 mm, the obtained resin composition was subjected to extrusion molding at a resin temperature of 260° C., a rotation speed of 50 rpm, and a line speed of 2.0 m/min., and then the film having a width of 50 μm was obtained.

A carbon fiber cloth (made by Sunlight, CF3000) was left in an oven that had been heated to 300° C. for 15 minutes for pretreatment. 10 sheets of the pretreated carbon fiber cloth were cut into a size of 25 cm in length and 25 cm in width, and 20 sheets of the produced film were cut into a size of 25 cm in length and 25 cm in width. 20 sheets of the film and 10 sheets of the carbon fiber cloth were laminated in a mold in the order of film/carbon fiber cloth/film/film/carbon fiber cloth/film/film/carbon fiber cloth/film (repeated).

The mold was pressurized for 5 minutes at a temperature of 260° C., a preheating time of 10 minutes, and a pressure of 4 MPa using a melt heat press machine (made by Tester Sangyo Co., Ltd.). Thereafter, the mold was cooled to obtain the fiber-reinforced molded product in a flat shape having a thickness of 2.3 mm.

The obtained fiber-reinforced molded product was measured for the bending strength and Izod impact strength. The results are shown in Table 3.

TABLE 3

| Blend (% by volume) | Example 7 | Example 8 | Example 9 |
|---|---|---|---|
| Polyamide A-1 | 90 | 80 | 70 |
| Fluorinated polymer B-3 | 10 | 20 | 30 |

TABLE 3-continued

| Blend (% by volume) | Example 7 | Example 8 | Example 9 |
|---|---|---|---|
| Izod impact strength (J/m) | 1590 | 1770 | 1870 |
| Bending strength (MPa) | 840 | 770 | 680 |

Examples 10 and 11 and Comparative Examples 8 to 11

Fluororesin B-1 and Polyamides A-3 and A'-4

The polyamide and the fluororesin were dry-blended in the proportions as shown in Table 3 and charged into a twin screw extruder (made by Technobel, KZW15TW-45MG), and then were melt-blended under the following condition to obtain the resin composition: a throughput rate of 2.0 kg/hour, a screw rotation rate of 200 rpm, and a resin temperature of 240° C. In addition, the blend ratio shown in Table 2 is volume %, and was calculated by specifying the specific gravity of the polyamide as 1.02 and the specific gravity of the fluororesin as 1.75.

Using a single screw extruder (made by Tanabe Plastics Machine Co., Ltd., VS-30) and a T die having a width of 400 mm, the obtained resin composition was subjected to extrusion molding at a resin temperature of 220° C., a rotation speed of 50 rpm, and a line speed of 2.0 m/min., and then and evaluated for the film moldability (1). The evaluation results are shown in Table 4.

TABLE 4

| Blend (% by volume) | Example 10 | Example 11 | Comparative Example 8 | Comparative Example 9 | Comparative Example 10 | Comparative Example 11 |
|---|---|---|---|---|---|---|
| Polyamide A-3 | 90 | 80 | 100 | — | — | — |
| Polyamide A'-4 | — | — | — | 100 | 90 | 80 |
| Fluorinated polymer B-1 | 10 | 20 | — | — | 10 | 20 |
| Melt flow rate (g/10 min.) | 62 | 48 | 98 | 4.4 | 2 | 1.4 |
| Film moldability (1) | ◯ | ◎ | X | ◎ | ◎ | ◎ |
| Impregnation | ◯ | ◯ | ◯ | X | X | X |

Comparative Example 1 could not be molded into the film unlike Examples 1 to 4. Although Comparative Examples 2 and 3 could be molded into the film, the melt flow rate of the composition was small and the melt fluidity was poor, so the impregnation property into the fiber sheet was poor. As shown in Comparative Example 4, when the viscosity number of the polyamide was small, it was difficult to be molded into the film even though it was combined with ETFE having no adhesive functional group. In Comparative Example 5, it was difficult to be molded into the film, and the fiber-reinforced molded product could not be obtained. Comparative Examples 6 and 7 were inferior to Examples 5 and 6 in the viewpoint of the Izod impact strength, tensile strength, and bending strength.

As shown in Comparative Example 8, when PA12 was used as the polyamide, it could not be molded into the film, unlike Examples 10 and 11. Although Comparative Examples 9 to 11 could be molded into the film, the melt flow rate of the composition was small and the melt fluidity was poor, so the impregnation property into the fiber sheet was poor.

As shown in Examples 1 to 11, the polyamide having a low viscosity number and the fluororesin having an adhesive functional group could provide the resin composition which is excellent in the impregnation and the film moldability and which is excellent in the mechanical properties at the time of being molded into the fiber-reinforced molded product.

INDUSTRIAL APPLICABILITY

The resin composition of the present invention is useful as a matrix resin for the prepreg and the fiber-reinforced molded product.

This application is a continuation of PCT Application No. PCT/JP2018/034045, filed on Sep. 13, 2018, which is based upon and claims the benefit of priority from Japanese Patent Application No. 2017-176757 filed on Sep. 14, 2017, Japanese Patent Application No. 2017-195880 filed on Oct. 6, 2017 and Japanese Patent Application No. 2018-097288 filed on May 21, 2018. The contents of those applications are incorporated herein by reference in their entireties.

What is claimed is:

1. A resin composition comprising:
a polyamide having a viscosity number of from 100 to 170 determined by a method specified in ISO 307: 2007; and
a melt-processable fluororesin having at least one type of a functional group selected from the group consisting of a carbonyl group-containing group, a hydroxy group, an epoxy group and an isocyanate group, the melt-processable fluororesin having a melting point of from 100 to 325°C.,
wherein the polyamide and the melt-processable fluororesin are melt-blended.

2. The resin composition according to claim 1, wherein the polyamide is at least one type selected from the group consisting of polyamide 6, polyamide 66, polyamide 46, polyamide 11, polyamide 12, polyamide 9T, polyamide 610, polyamide 612, polyamide 6/66 copolymer, polyamide 6/66/610 copolymer, polyamide 6T, polyamide 6I and polyamide MXD6.

3. The resin composition according to claim 1, wherein the polyamide is polyamide 6, and the melt flow rate of the resin composition measured at a temperature of 260° C. under a load of 21.2N is from 20 to 150 g/10 min.

4. The resin composition according to claim 1, wherein the polyamide is polyamide 12 and the melt flow rate of the resin composition measured at a temperature of 250° C. under a load of 21.2N is from 20 to 120 g/10 min.

5. The resin composition according to claim 1, wherein, in the total volume of the polyamide and the fluororesin, the polyamide is from 55 to 95% by volume and the fluororesin is from 5 to 45% by volume, and the total of the polyamide and the fluororesin is from 80 to 100 mass % of the resin composition.

6. A prepreg comprising a matrix resin and a reinforcing fiber, wherein the matrix resin is the resin composition as defined in claim 1.

7. The prepreg according to claim 6, wherein the reinforcing fiber is a spread reinforcing fiber.

8. The prepreg according to claim 6, wherein the reinforcing fiber is a reinforcing fiber textile, a reinforcing fiber knitting, or a unidirectional reinforcing fiber bundle.

9. A fiber-reinforced molded product, formed by molding the prepreg as defined in claim 6.

10. A molded product made of the resin composition as defined in claim 1.

11. The molded product according to claim 10, wherein the molded product is a film or a fiber.

12. A method for producing a fiber-reinforced molded product, wherein a reinforcing fiber sheet and the film as defined in claim 11 are laminated in a mold and then molded by hot pressing.

13. A method for producing a prepreg, wherein the molded product as defined in claim 10 is melted in the presence of a reinforcing fiber sheet and impregnated in the reinforcing fiber sheet.

14. The method for producing a prepreg according to claim 13, wherein the reinforcing fiber sheet is a spread reinforcing fiber sheet.

15. The method for producing a prepreg according to claim 13, wherein the reinforcing fiber sheet is a reinforcing fiber textile, a reinforcing fiber knitting, or a unidirectional reinforcing fiber bundle.

16. A method for producing a fiber-reinforced molded product, wherein a prepreg is obtained in accordance with the method for producing a prepreg as defined in claim 13 and then the prepreg is molded.

* * * * *